United States Patent
Levy et al.

(10) Patent No.: US 12,155,979 B2
(45) Date of Patent: Nov. 26, 2024

(54) CABLE PILLAR FOR DIRECTOR SWITCH SYSTEMS

(71) Applicant: MELLANOX TECHNOLOGIES, LTD., Yokneam (IL)

(72) Inventors: Ofer Levy, Kiryat Ono (IL); Avi Gibbs, Rehovot (IL); Samer Khoury, Nof Haglil (IL); Igor Loiferman, Yokneam Ilit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 183 days.

(21) Appl. No.: 17/706,119

(22) Filed: Mar. 28, 2022

(65) Prior Publication Data
US 2023/0308785 A1 Sep. 28, 2023

(51) Int. Cl.
*H04Q 1/06* (2006.01)

(52) U.S. Cl.
CPC ............. *H04Q 1/064* (2013.01); *H04Q 1/068* (2013.01)

(58) Field of Classification Search
CPC ........... H04Q 1/064; H04Q 1/068; H04Q 1/06
See application file for complete search history.

(56) References Cited

U.S. PATENT DOCUMENTS

| | | | | |
|---|---|---|---|---|
| 7,193,847 B2* | 3/2007 | Liang | ................... | H05K 7/1445 |
| | | | | 361/679.48 |
| 7,729,116 B1* | 6/2010 | Aybay | ................ | H05K 7/20736 |
| | | | | 361/679.48 |
| 9,357,057 B1* | 5/2016 | Barrett | .................. | H04M 1/738 |
| 2008/0318465 A1* | 12/2008 | Johnsen | ................. | G06F 11/30 |
| | | | | 439/488 |
| 2014/0002988 A1* | 1/2014 | Roesner | ............. | H05K 7/20727 |
| | | | | 361/679.49 |
| 2014/0369001 A1* | 12/2014 | Miller | .................. | H05K 7/1425 |
| | | | | 361/752 |
| 2018/0054922 A1* | 2/2018 | Leigh | ................. | H05K 7/20727 |

* cited by examiner

*Primary Examiner* — Phung-Hoang J Nguyen
(74) *Attorney, Agent, or Firm* — Sheridan Ross P.C.

(57) ABSTRACT

A cable pillar is provided for use in a switch system. The cable pillar includes a cavity that enables a plurality of cables to pass from a first side to a second side of the cable pillar. For example, the cables may be routed from sets of access paths located in rails mounted on the sides of the cable pillar to enlarged access paths located near the top or bottom of the cable pillar. The enlarged access paths may be sized to receive every cable that passes through a set of access paths located on an opposing side of the cable pillar from a corresponding enlarged access path. Additionally, the cable pillar may be configured to releasably attach to a chassis of the switch system. In some examples, the plurality of cables accommodated by the cable pillar may serve as a cable backplane of the switch system.

20 Claims, 17 Drawing Sheets

CABLE PILLAR FOR DIRECTOR SWITCH SYSTEMS

FIELD OF THE DISCLOSURE

The present disclosure is generally directed to systems, methods, and devices for switch systems, in particular, toward a cable pillar for director switch systems.

BACKGROUND

Network switches are used in networking systems, like datacenters, for routing data between endpoints. In some examples, multiple network switches can be placed within a chassis unit that includes or supports connections between other chassis units, network switches (e.g., within a same chassis unit and/or between other chassis units), leaf/spine switches, management modules, power units, cooling units, input/output (I/O) units, etc. As the number of network switches and other components placed into a chassis increases, the number of cables needed to interconnect the switches and components also increases. However, traditional cable routing may be insufficient to accommodate the high number of cables needed for different chassis configurations.

BRIEF SUMMARY

In an illustrative embodiment, a cable pillar layer configured to be included in a cable pillar for use in a director switch, is described. The cable pillar layer may include a main support structure comprising a first face, a second face, a top end, a bottom end, a first side end, and a second side end, wherein the first face opposes the second face; a first rail mounted on the main support structure, wherein the first rail comprises a first set of access paths and wherein the first rail is configured to attach to a chassis of the director switch; and a second rail mounted on the main support structure, wherein the second rail comprises a second set of access paths, wherein the second rail is configured to attach to the chassis of the director switch, and wherein the first rail and the second rail, when mounted on the main support structure, create a cavity adjacent to the first face of the main support structure that enable a plurality of cables to pass from the first side end of the main support structure across the first face of the main support structure and to the second side end of the main support structure.

In at least one embodiment, a depth of the cavity is greater than a thickness of one of the cables in the plurality of cables.

In at least one embodiment, the cable pillar layer further includes a third rail mounted on the main support structure and a fourth rail mounted on the main support structure. The third rail may be mounted to the top end of the main support structure and the fourth rail may be mounted on the bottom end of the main support structure.

In at least one embodiment, the cable pillar layer further includes a first enlarged access path provided between the first rail and the third rail and a second enlarged access path provided between the second rail and fourth rail. In some embodiments, the first enlarged access path is sized to receive every cable that passes through the second set of access paths and the second enlarged access path is configured to receive every cable that passes through the first set of access paths.

In at least one embodiment, a size of the first enlarged access path is at least four times greater than a size of an access path in the second set of access paths and a size of the second enlarged access path is at least four times greater than a size of an access path in the first set of access paths.

In at least one embodiment, the cable pillar layer further includes a third enlarged access path provided between the second rail and the third rail and a fourth enlarged access path provided between the first rail and fourth rail.

In at least one embodiment, the main support structure is substantially planar.

In at least one embodiment, a number of access paths in the first set of access paths is equal to a number of access paths in the second set of access paths.

In at least one embodiment, the first rail and the second rail reinforce a stiffness of the main support structure.

In at least one embodiment, the first rail and the second rail are both configured to releasably attach to the chassis of the director switch.

In at least one embodiment, each access path in the first set of access paths is sized to receive at least a CAT5 cable and each access path in the second set of access paths is sized to receive at least the CAT5 cable.

In at least one embodiment, the plurality of cables are part of a cable backplane.

In at least one embodiment, the first rail is mounted on the first side end of the main support structure and the second rail is mounted on the second side end of the main support structure.

In an illustrative embodiment, a switch is provided. The switch may illustratively include: a chassis; a plurality of switch modules mounted in the chassis; and a cable backplane comprising a plurality of cables that interconnect the plurality of switch modules, where the cable backplane is at least partially contained in and supported by a cable pillar, where the cable pillar includes a cable pillar layer comprising: a main support structure comprising a first face, a second face, a top end, a bottom end, a first side end, and a second side end, where the first face opposes the second face; a first rail mounted on the main support structure, where the first rail comprises a first set of access paths and where the first rail attaches to the chassis; and a second rail mounted on the main support structure, where the second rail comprises a second set of access paths, where the second rail attaches to the chassis, and where the first rail and the second rail create a cavity adjacent to the first face of the main support structure that enable the plurality of cables to pass from the first side end of the main support structure across the first face of the main support structure and to the second side end of the main support structure.

In at least one embodiment, the cable pillar layer further includes a third rail mounted on the main support structure and a fourth rail mounted on the main support structure.

In at least one embodiment, the cable pillar layer further includes a first enlarged access path provided between the first rail and the third rail, where the first enlarged access path is sized to receive every cable that passes through the second set of access paths. The cable pillar layer may also include a second enlarged access path provided between the second rail and fourth rail, where the second enlarged access path is configured to receive every cable that passes through the first set of access paths.

In at least one embodiment, the switch further includes a second cable pillar layer mounted to the chassis adjacent to the cable pillar layer, where a first set of cables in the plurality of cables are retained in the cavity of the cable pillar layer, and where a second set of cables in the plurality of cables are retained in a cavity of the second cable pillar layer.

In at least one embodiment, the plurality of switch modules comprise spine modules and leaf modules and where the cable backplane connects each of the spine modules with at least one leaf module.

In an illustrative embodiment, a networking device is provided. The networking device may illustratively include a plurality of switch modules and a cable pillar comprising a plurality of cables that interconnect the plurality of switch modules. In some embodiments, the cable pillar includes: a first cable pillar layer having a first cavity through which a first set of cables from the plurality of cables pass through; and a second cable pillar layer having a second cavity through which a second set of cables from the plurality of cables pass through.

In at least one embodiment, the first cable pillar layer includes: a main support structure comprising a first face, a second face, a top end, a bottom end, a first side end, and a second side end, wherein the first face opposes the second face; and a set of access paths adjacent to the first cavity, where the set of access paths facilitate a pre-routing of the plurality of cables through the first cavity according to a routing plan and further support the first set of cables in an absence of the first cable pillar being interconnected to the plurality of switch modules.

In at least one embodiment, the first cable pillar layer further includes: a first rail mounted on the top end of the main support structure; a second rail mounted on the bottom end of the main support structure; a third rail mounted on the first side end of the main support structure; a fourth rail mounted on the second side end of the main support structure; a first enlarged access path provided between the first rail and the third rail; and a second enlarged access path provided between the second rail and fourth rail.

In at least one embodiment, the set of access paths pass through a rail mounted on at least one of the top end of the main support structure, the bottom end of the main support structure, the first side end of the main support structure, and the second side end of the main support structure.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
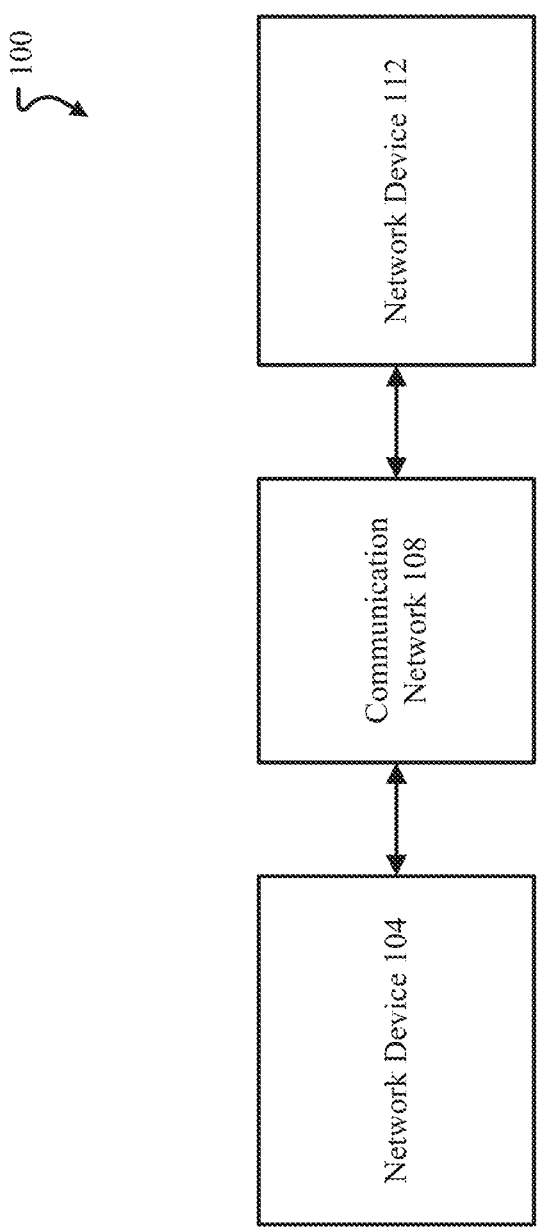
FIG. 1 illustrates a block diagram of a networking system according to at least one example embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

In some cases, switch systems (e.g., director switches) are built from a single and complex chassis unit that connects between other chassis units, other switch systems, leaf/spine switches, management modules, power units, cooling units, input/output (I/O) units, etc. Additionally, the switch systems can include multiple network switches (e.g., leaf switches, spine switches, etc.) within the single chassis unit, where the multiple network switches need to be connected to each other and/or other components within the switch system and chassis unit via corresponding cables. As the number of network switches within the switch system and chassis unit increases, the number of cables needed for the interconnections between the network switches and any other necessary components for the switch system also increases.

As a non-limiting example of a switch system, a director switch structure may include a configuration where cables needed for the director switch serve as a backplane for the director switch. With the cables serving as the backplane or, more generally, when a high number of cables are needed for a switch system, routing of many cables is required between different switches and components of the switch system. In some cases, the cable routing may need to be dense to fit all of the necessary cables into the switch system. Additionally, performing or arranging the cable routing as the switch system is being installed on a site may be challenging. For example, space may be limited on the site, hindering the ability of easily routing the cables needed for the switch system. Additionally, performing maintenance on one or more cables in case of failure may provide problems as the number of cables in the switch system increases and if the cables are not properly and neatly routed. Traditional cable routing cannot answer these requirements. Accordingly, parts or components are desired for a switch system that accommodates a high number of cables in a dense setting to fit into required switch system sizes, that can be easily assembled on site, and that can support maintenance on all of the cables or a single cable.

It is with respect to the above issues and other problems that the embodiments presented herein were contemplated.

Inventive concepts relate to a design for a cable midplane or a cable pillar for a director switch (e.g., or other type of switch system) that is routed with cables in advance of installing the director switch at a site (e.g., at a manufacturer site). The cable pillar is constructed similar to a pillar with cables that are routed across the pillar with cable exit hatches across the pillar. The cables are pre-routed inside the pillar according to specified requirements of the director switch. That is, cables may be routed at the manufacture site in pre-defined routing paths inside a metal/plastic structure that can be mounted on a chassis for the director switch. Once the cable pillar is mounted on the chassis, the cable edges can be assembled or plugged into corresponding network switches of the director switch (e.g., leaf switches, spine switches, etc.).

In some examples, the cable pillar includes one or more cable pillar layers that are built from a plastic and/or metal structure that unites all the cables of a single rack side or two adjacent sides of two racks into one structure. The cable pillar layers which collectively form the cable pillar can be mounted on the chassis. The cable pillar layers can be replaced individually or multiple cable pillar layers can be replaced simultaneously, meaning the entirety of the cable pillar can be replaced as a whole unit if needed. Each cable pillar layer may have a pre-defined routing order. In other words, the cable pillar layer may accommodate and, in some instances, support a number of cables that are mounted in the cable pillar layer according to a pre-defined routing plan. By having a pre-defined routing plan or routing order, the cable pillar layer can be constructed in a controlled environment, other cable pillar layers can also be constructed individually, all cable pillar layers can then be shipped for installation into a larger switch or system. This helps avoid mistakes in routing cables on-site.

Some of the cable pillar layers can have a same routing order or a mirrored order or a completely different order. This structure using layers has additional benefits. For example, in case of a cable failure, instead of disassembling the entire structure of the cable pillar, the cable pillar layers that are located on top of the failed cable can be removed from the cable pillar, and only the cable pillar layer of the faulty cable is replaced/fixed. Additionally, the cable pillar may be very heavy as a collection of many cable pillar layers, such that one or two people may have trouble lifting or installing the cable pillar themselves. By assembling/disassembling the cable pillar layer by layer on or from the chassis, a single person can mount the entire pillar on their own.

FIG. 1 illustrates a system 100 according to at least one example embodiment. The system 100 includes a network device 104, a communication network 108, and a network device 112. In at least one example embodiment, network devices 104 and 112 may correspond a network switch (e.g., an Ethernet switch), a collection of network switches, a network interface controller (NIC), or any other suitable device used to control the flow of data between devices connected to communication network 108. Each network device 104 and 112 may be connected to one or more of Personal Computer (PC), a laptop, a tablet, a smartphone, a server, a collection of servers, or the like. In one specific, but non-limiting example, each network device 104 and 112 includes multiple network switches in a fixed configuration or in a modular configuration.

Examples of the communication network 108 that may be used to connect the network devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the network devices 104 and 112 using Ethernet technology. In one specific, but non-limiting example, the network devices 104 and 112 correspond to director switches that may have a modular configuration. As discussed in more detail below, a network switch (e.g., a director switch) according to inventive concepts may implement multiple layers of a network topology as field replaceable units (FRUs) or customer replaceable units (CRUs) within a single chassis.

Although not explicitly shown, the network device 104 and/or the network device 112 may include storage devices and/or processing circuitry for carrying out computing tasks, for example, tasks associated with controlling the flow of data within each network device 104 and 112 and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random-Access Memory (RAM), Read-Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an IC chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a PCB or collection of PCBs. It should be appreciated that any appropriate type of electrical component or collection of electrical components may be suitable for inclusion in the processing circuitry.

In addition, although not explicitly shown, it should be appreciated that the network devices 104 and 112 include one or more communication interfaces for facilitating wired and/or wireless communication between one another and other unillustrated elements of the system 100.

Figure 2:
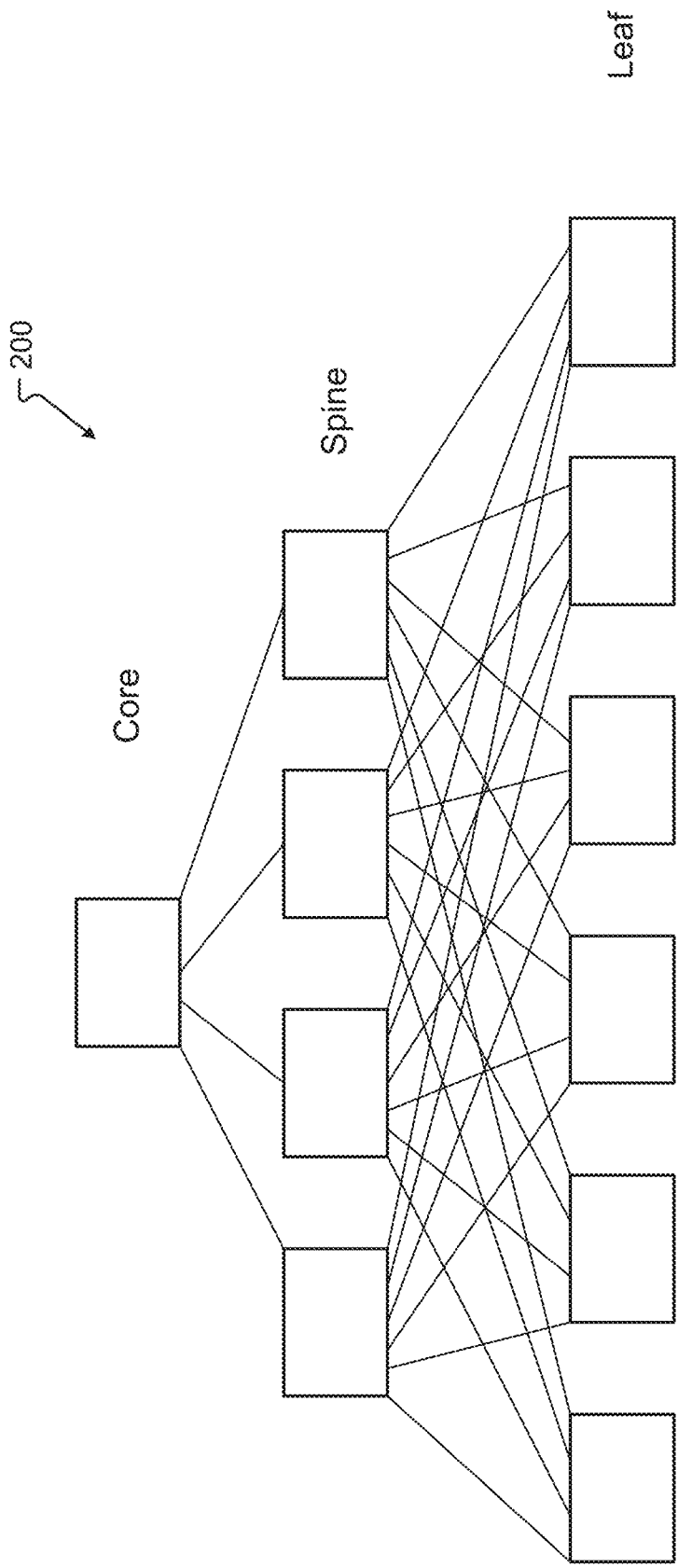
FIG. 2 illustrates a networking topology according to at least one example embodiment of the present disclosure.

FIG. 2 illustrates a networking topology 200 according to at least one example embodiment. The topology 200 is a three-tier topology with core, spine (or aggregation), and leaf (or access) tiers. Each box of each tier represents a collection of network switches that is repeated for that tier. Although not explicitly shown, endpoints that comprise servers and/or user terminals may be connected to the leaf tier. Here, it should be appreciated that example embodiments are not limited to the topology 200, and inventive concepts may be applied to other suitable network topologies (e.g., a two-tier topology with spine and leaf tiers, dragonfly network topologies, etc.). As discussed in more detail below, example embodiments relate to a modular network switch structure capable of accommodating or supporting different switch topologies and sizes that also enables the use of standard cables for connections between switches, network devices, etc., thereby simplifying maintenance operations (e.g., if a cable fails) and reducing a need of redesigns and replacement of network switches for future generations and designs of switch systems.

Figure 3A:
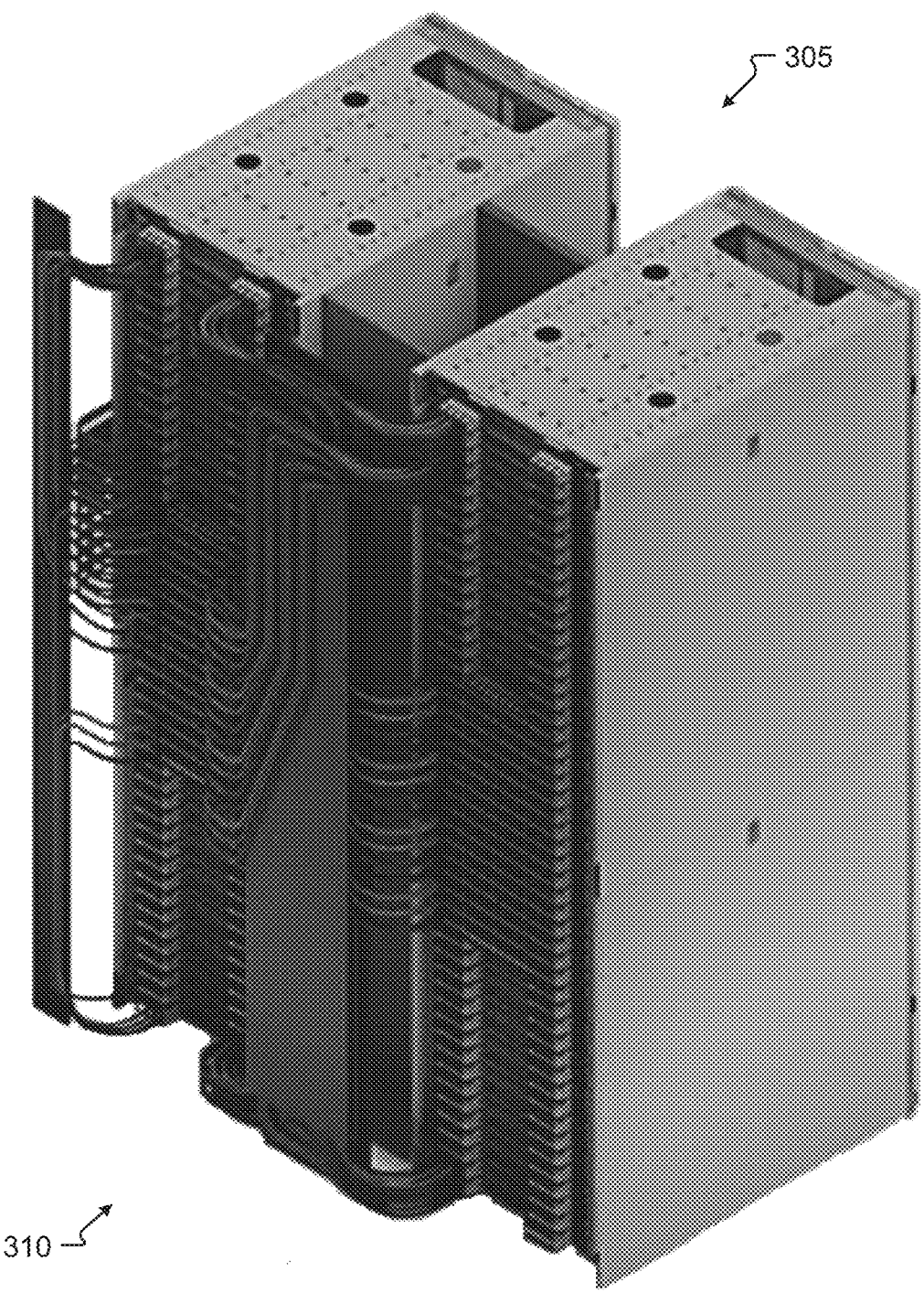
FIGS. 3A to 3C illustrate a switch system that includes at least one network switch in accordance with embodiments of the present disclosure.
Figure 3B:
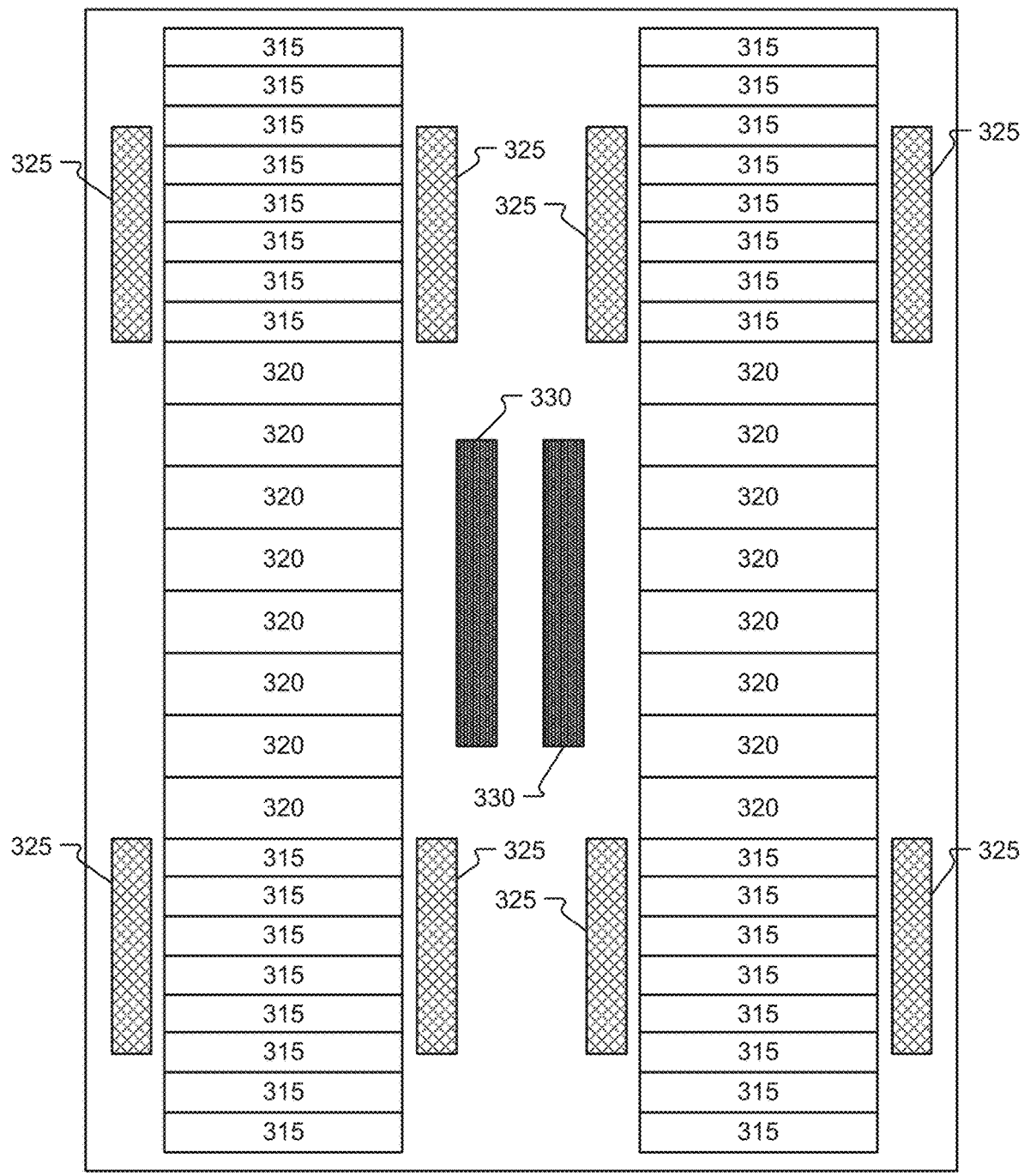
Figure 3C:
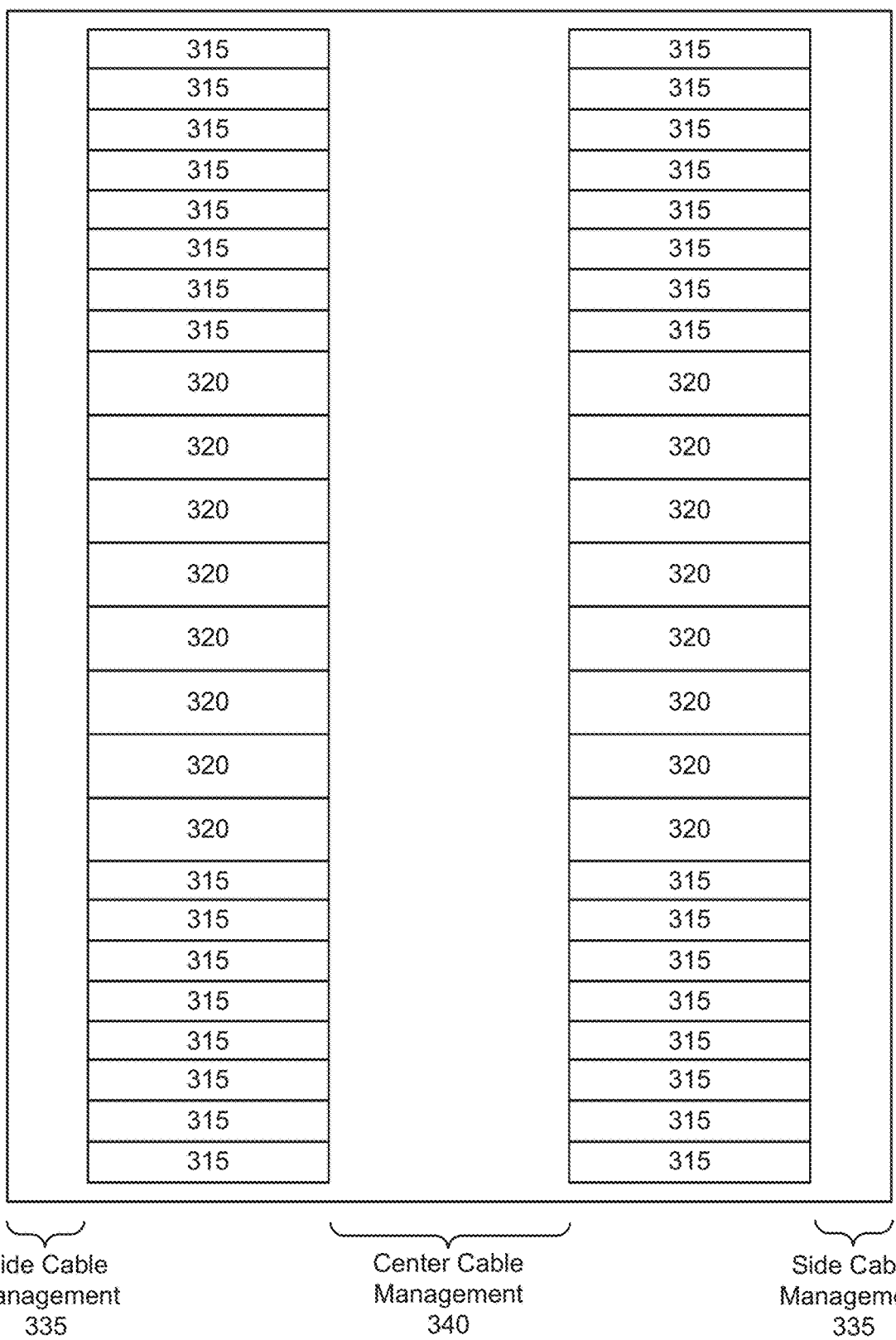

FIGS. 3A, 3B, and 3C illustrate various views of a switch system 300 in accordance with aspects of the present disclosure. In some examples, the switch system 300 may include or represent one or more racks designed to hold one or more network switches for routing data between endpoints in network systems (e.g., datacenters). Additionally, the switch system 300 may include a chassis that is manufactured to accommodate and hold one or more CRUs and any cables to support the CRUs. For example, the CRUs may include network switches. As a non-limiting example, the switch system 300 may represent a director switch as described with reference to FIGS. 1 and 2. Accordingly, the CRUs that can be placed into the switch system 300 may include leaf layers/switches, spine layers/switches, or other types of network switches. As shown in the example of FIG. 3A, the switch system 300 may include a front side 305 and a back side 310.

FIG. 3B illustrates an example schematic of the front side 305 of the switch system 300. In some examples, the front side 305 may be referred to as the cold side or cold aisle side of the switch system 300. As described previously, the switch system 300 may include one or more CRUs. For example, the one or more CRUs may include a first type of network switches 315 (e.g., leaf switches) and a second type of network switches 320 (e.g., spine switches). Additionally, the front side 305 may also include one or more power distribution units (PDUs) 325 to provide electrical power for any components that need electricity on the switch system 300 or for additional component to support operation of the switch system 300. In some examples, the switch system 300 may also include a third type of network switch 330 (e.g., Ethernet switches) to provide additional features and support to the switch system 300.

FIG. 3C illustrates an example schematic of the back side 310 of the switch system 300. In some examples, the back side 310 may be referred to as the hot side or hot aisle side of the switch system 300. The back side 310 includes access to the rear of the first type of network switches 315 and the second type of network switches 320 as described with reference to FIG. 3B. Additionally, the back side 310 includes areas for side cable management 335 and an area for center cable management 340. These areas for cable management allow for any cables needed to connect the different components of the switch system 300 to be arranged in an orderly fashion without getting in the way or affecting the performance of the switch system 300.

Figure 4A:
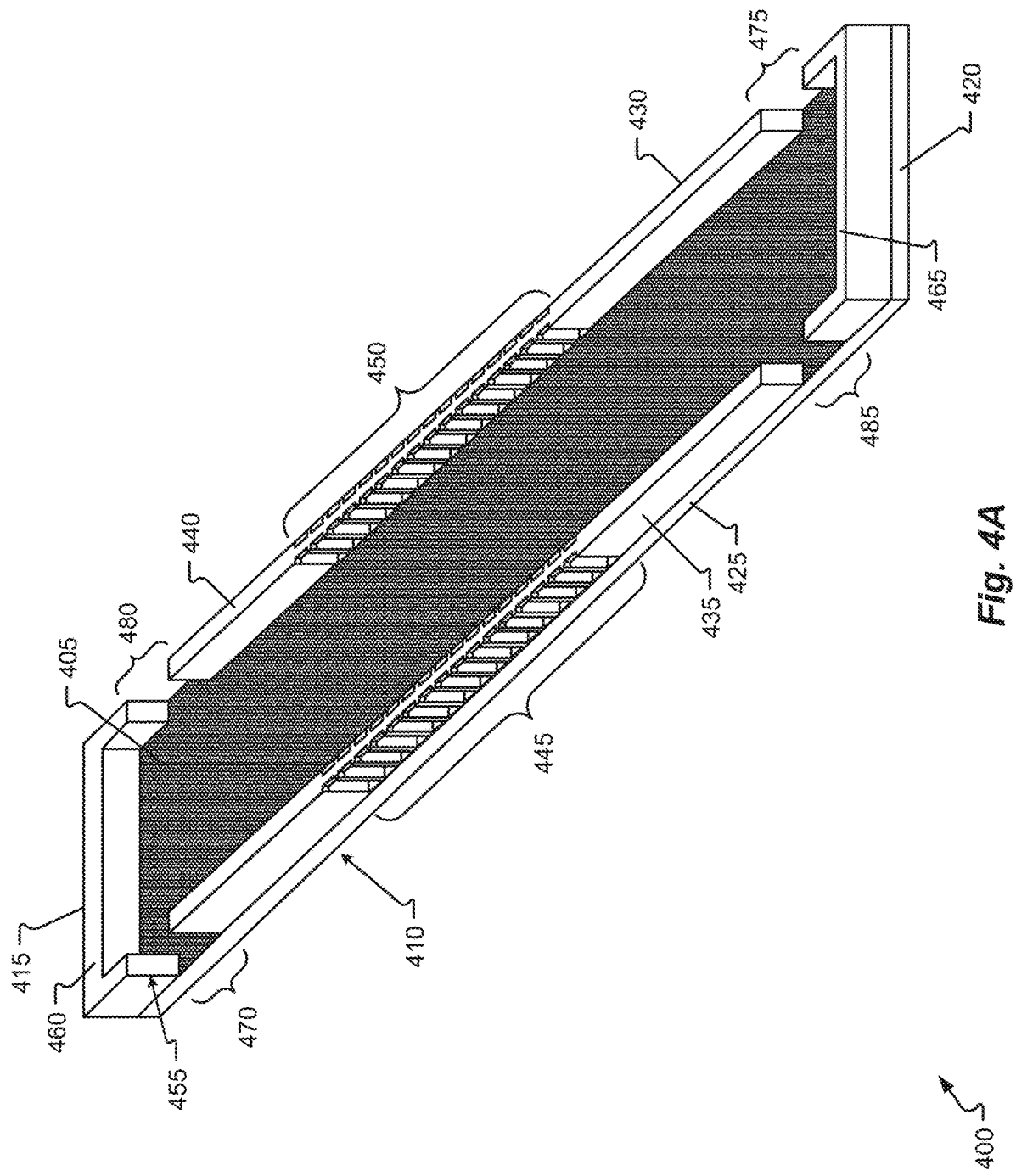
FIGS. 4A to 4C illustrate different views of an example cable pillar layer configuration in accordance with embodiments of the present disclosure.
Figure 4B:
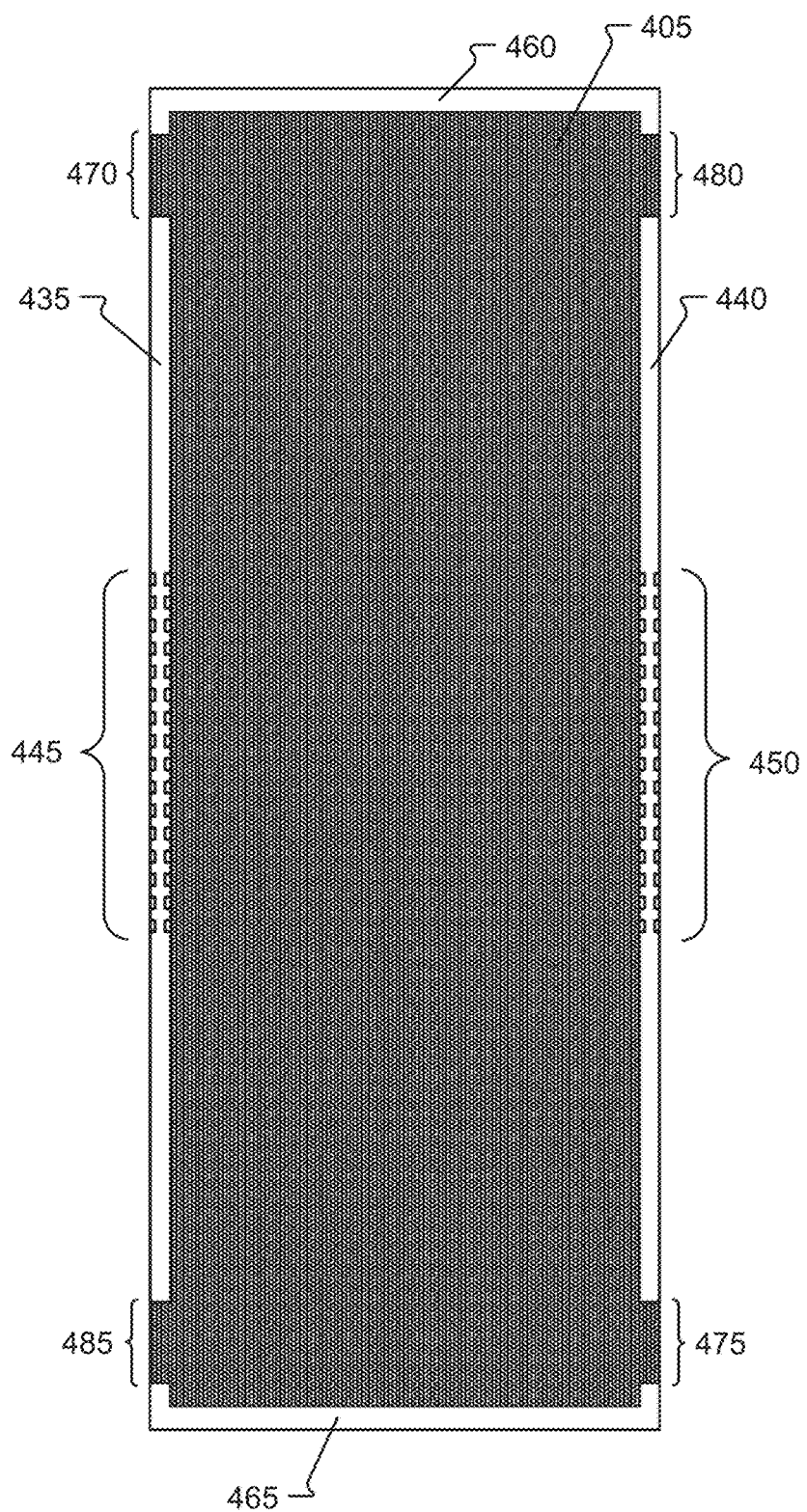
Figure 4C:
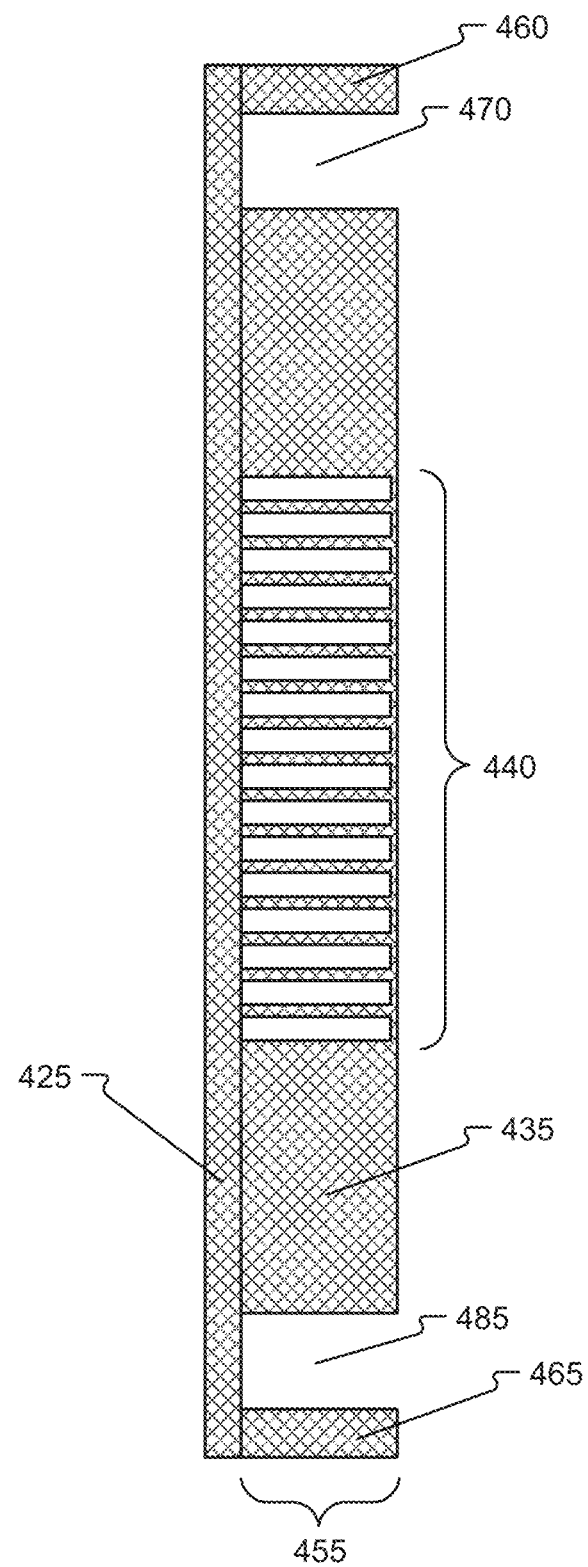

As described herein and in more detail with reference to FIGS. 4A, 4B, and 4C, the area for the center cable management 340 may include a cable pillar used to route any necessary cables for the switch system 300 (e.g., between the different types of network switches 315 and 320). For example, the cable pillar may include one or more cable pillar layers that provide access paths on their sides to provide routes for cables to connect to the second type of network switches 320 (e.g., spine switches). Each cable pillar layer may include enlarged access paths near its top and bottom to provide a route for the cables from the side access paths and connects the cables to the first type of network switches 315 (e.g., leaf switches, Top of Rack (ToR) switches, switches at the bottom of the racks, etc.).

While particular configurations of a cable pillar and cable pillar layers are depicted and described, it should be appreciated that a cable pillar layer may be configured for use within the center cable management 340 and/or side cable management 335. In other words, it may be possible to provide middle cable pillar layers and side cable pillar layers. Middle cable pillar layers provided in the center cable management 340 may be configured to support cables that route from one side of the cable pillar to another side of the cable pillar. Illustratively, but without limitation, the cables may pass between a left side and right side of the cable pillar. It may also be possible to provide a cable pillar layer that allows cables to pass between two other sides such as the top side and bottom sides of the cable pillar layer or between non-opposite sides of the cable pillar layer. For instance, the cable pillar layer may be configured to allow cables to pass from a top side of the cable pillar layer to a left or right side of the cable pillar layer. On a cable pillar layer designed for use in the side cable management 335, the cable pillar layer may be configured to have cables routing into and out of the same side of the cable pillar layer. For example, all cables held by a side cable pillar layer may enter and exit the same side (e.g., left side or right side) of the cable pillar layer.

The construction of the cable pillar layer may include or create a cavity within the cable pillar layer with a depth that accommodates the needed cables to be routed between the side access paths and the enlarged access paths near the top and bottom. The cable pillar layer may also attach directly to the chassis for the switch system 300 or to other cable pillar layers. The cable(s) passing through any cable pillar layer may serve as a cable backplane or part of a cable backplane for the switch system 300. That is, in some examples, the cables may be routed at a manufacturer site in pre-defined routing paths inside a metal/plastic structure (e.g., the cable pillar layer) that can be mounted on a chassis for the switch system 300 (e.g., a director switch). Once the cable pillar layer is mounted on the chassis, the cable edges (e.g., ends of the cables) can be assembled or plugged into corresponding network switches of the switch system 300 (e.g., leaf switches, spine switches, etc.).

Accordingly, by using this cable pillar and cable pillar layer construction, the cables needed for the center cable management 340 of the switch system 300 can be arranged in a dense manner to fit into required switch system sizes (e.g., for modular chassis constructions with fixed sizes). Additionally, the cable pillar may enable or support an easier installation of the switch system 300 on site where the switch system 300 will be located. For example, the cable pillar may be constructed using one or multiple cable pillar layers that can be put together and mounted on the chassis by one or two people on site without having to lift the heavy cable pillar all at once to mount on the chassis. Additionally, the cable pillar construction (e.g., using the multiple cable pillar layers) may enable easier maintenance for accessing and replacing any failed cables by removing less components or cable pillar layers of the cable pillar rather than disassembling the entire switch system 300 or the entire cable pillar.

FIGS. 4A to 4C illustrate different views of an example cable pillar layer configuration in accordance with embodiments of the present disclosure as described herein. FIG. 4A illustrates a perspective view 400 of the example cable pillar layer configuration. It should be noted that the cable pillar layer configuration illustrated in FIGS. 4A to 4C is an example configuration, and different configurations and constructions of the cable pillar layer as described herein can be used for a given switch system (e.g., director switch) that have different measurement, proportions, etc. than shown.

The cable pillar layer illustrated in FIGS. 4A to 4C includes a main support structure (e.g., a first layer of the cable pillar layer) that includes a first face 405 (e.g., a front face of the main support structure), a second face 410 (e.g., bottom face of the main support structure), a top end 415, a bottom end 420, a first side end 425 (e.g., left side of the main support structure as shown), and a second side end 430 (e.g., right side of the main support structure as shown). This main support structure may be substantially planar, where the second face 410 can be viewed as a planar surface of the main support structure that encompasses an opposite face as the first face 405. Additionally, the cable pillar layer may include a first rail 435 and a second rail 440. As shown, the first rail 435 is mounted on the first side end 425 of the main support structure, and the second rail 440 is mounted on the second side end 430 of the main support structure. However, the first rail 435 and the second rail 440 may interchangeably be mounted to the opposite side ends of the main support structure.

In part, the first rail 435 and the second rail 440 may reinforce a stiffness of the main support structure and the cable pillar layer as a whole. Additionally, the first rail 435 and the second rail 440 are configured and constructed to attach to a chassis of a switch system for which the cable pillar is a part (e.g., as illustrated and described with reference to FIGS. 3A to 3C, such as a director switch with the cable pillar and the corresponding cables serving as a cable backplane for the director switch). For example, the first rail 435 and the second rail 440 are both configured or constructed to releasably attach to the chassis of the switch system. Alternatively or additionally, the first rail 435 and/or second rail 440 may be configured to attach to another cable pillar layer.

The first rail 435 and the second rail 440 may also include respective sets of access paths for routing needed cables in the cable pillar layer for the switch system of which the cable pillar is a part. For example, the first rail 435 may include a first set of access paths 445, and the second rail 440 may include a second set of access paths 450. Cables can be routed from the first side end 425 to the second side end 430 (and vice versa from the second side end 430 to the first side end 425) using the sets of access paths. In some examples, each access path in the first set of access paths 445 and in the second set of access paths 450 is sized to receive at least a Category 5 (CAT5) cable. Additionally, the number of access paths in the first set of access paths 445 may be equal to the number of access paths in the second set of access paths 450. Alternatively, the number of access paths in the first set of access paths 445 may be different than the number of access paths in the second set of access paths 450. While 16 access paths are shown in each of the first set of access paths 445 and the second set of access paths 450, a different number of access paths can be configured for the rails and the cable pillar layer. In some examples, the switch system and the chassis may include a cable pillar having a first cable pillar layer and a second cable pillar layer, where a first subset of cables in the plurality of cables are retained in the cavity of the first cable pillar layer and a second subset of cables in the plurality of cables are retained in a cavity of the second cable pillar layer. The first cable pillar layer may be mounted directly to the chassis while the second cable pillar layer is connected to the first cable pillar layer, meaning that the first cable pillar layer resides between the chassis and the second cable pillar layer.

Additionally, with the first rail 435 and the second rail 440 mounted on the main support structure, a cavity of a depth 455 is created adjacent to the first face 405 of the main support structure that can accommodate a plurality of cables needed for the switch system. For example, the cavity may enable the plurality of cables to be routed through the cable pillar layer or pass from the first side end 425 across the first face 405 and to the second side end 430 (and vice versa). Accordingly, the depth 455 of the cavity may be greater than a thickness of one of the cables in the plurality of cables (e.g., to accommodate the plurality of cables and enable mounting of the cable pillar onto the chassis without the cables impacting the mounting).

In addition to the main support structure, the first rail 435, and the second rail 440, the cable pillar layer may also include a third rail 460 mounted to the main support structure and a fourth rail 465 mounted to the main support structure. As shown, the third rail 460 is mounted on the top end 415 of the main support structure, and the fourth rail 465 is mounted on the bottom end 420 of the main support structure. However, the third rail 460 and the fourth rail 465 may interchangeably be mounted to the opposite ends of the main support structure.

With the third rail 460 and the fourth rail 465 mounted on the main support structure, additional access paths are provided on the cable pillar layer. For example, as shown in the example of FIG. 4A, a first enlarged access path 470 is provided between the first rail 435 and the third rail 460, a second enlarged access path 475 is provided between the second rail 440 and the fourth rail 465, a third enlarged access path 480 is provided between the second rail 440 and the third rail 460, and a fourth enlarged access path 485 is provided between the second rail 435 and the fourth rail 465. In some examples and as will be illustrated and described in greater detail with reference to FIGS. 5A and 5B, the enlarged access paths are sized to receive every cable that passes through the set of access paths on the opposite side of a given enlarged access path. For example, the first enlarged access path 470 and/or the fourth enlarged access path 485 may be sized to receive every cable that passes through the second set of access paths 450, while the second enlarged access path 475 and/or the third enlarged access path 480 may be sized to receive every cable that passes through the first set of access paths 445. Additionally, a size of the enlarged access paths may be at least four times greater than a size of an individual access path in a corresponding set of access paths.

As an example embodiment, the cable pillar layer described herein may be used for a director switch, where the cables that pass through or are routed through the cable pillar layer are used to connect different types of network switches in the director switch. For example, the cables passing through the sets of access paths 445 and 450 may be connected to one or more spine modules (e.g., spine switches) of the director switch, and the cables passing through the enlarged access paths may be connected to one or more leaf modules (e.g., leaf switches) of the director switch (e.g., ToR switches, switches at the bottom of the rack for the director switch, etc.). Accordingly, the plurality of cables passing through the cable pillar layer may serve or partially serve as a cable backplane of the director switch (e.g., the cable backplane is at least partially contained in and supported by the cable pillar layer), where the cable backplane connects each of the spine modules of the director switch with at least one leaf module of the director switch.

FIG. 4B illustrates a front view 401 of the cable pillar layer as described with reference to FIG. 4A. The cable pillar layer includes the first face 405 that has the adjacent cavity for enabling the plurality of cables to pass from the first side end 425 of the main support structure across the first face 405 and to the second side end 430 of the main support structure. For example, the first rail 435 includes the first set of the access paths 445, and the second rail 440 includes the second set of access paths 450, where cables are routed from a corresponding set of access paths to an enlarged access path on the opposite side of the cable pillar layer. That is, cables that pass through the first set of access paths 445 pass across the first face 405 and are routed to either the second enlarged access path 475 (e.g., provided between the second rail 440 and the fourth rail 465) or the third enlarged access path 480 (e.g., provided between the second rail 440 and the third rail 460). Additionally or alternatively, cables that pass through the second set of access paths 450 pass across the first face 405 and are routed to either the first enlarged access path 470 (e.g., provided between the first rail 435 and the third rail 460) or the fourth enlarged access path 485 (e.g., provided between the first rail 435 and the fourth rail 465).

It is understood that the front view 401 of the cable pillar layer is not necessarily drawn to scale, and the cable pillar layer described herein may have different dimensions or proportions than shown in the example of FIG. 4B. However, the dimensions and proportions of the cable pillar layer are such that each access path in the first set of access paths 445 and in the second set of access paths 450 is at least sized to receive at least a CAT5 cable and such that each enlarged access path is sized to at least receive every cable that passes through the set of access paths on the opposite side of a given enlarged access path, where each enlarged access paths is sized to at least four times greater than a size of an individual access path in a corresponding set of access paths.

FIG. 4C illustrates a side view 402 of the cable pillar layer as described with reference to FIGS. 4A and 4B. While the left side of the cable pillar layer is shown in the example of FIG. 4C with reference to the views and examples of FIGS. 4A and 4B, it is understood that the opposite side of the cable pillar layer (e.g., right side) has a same configuration but mirrored. The side view 402 illustrates the first rail 435 mounted on the main support structure of the cable pillar (e.g., mounted on the first side end 425. Additionally, the first set of access paths 440 of the first rail 435 are shown. As described previously, while 16 access paths are shown, a greater or lesser number of access paths may be configured for the first set of access paths 440. The side view 402 also illustrates the first enlarged access path 470 provided between the first rail 435 and the third rail 460 (e.g., also mounted on the main support structure of the cable pillar) and the fourth access path 485 provided between the first rail 435 and the fourth rail 465. In some examples, a depth of the enlarged access paths may correspond to the depth 455 for the cavity of the cable pillar layer that is created when the first rail 435 (e.g., and second rail 440 not shown) is mounted to the main support structure. Additionally or alternatively, the depth of the enlarged access paths may be smaller than the depth 455.

Figure 5A:
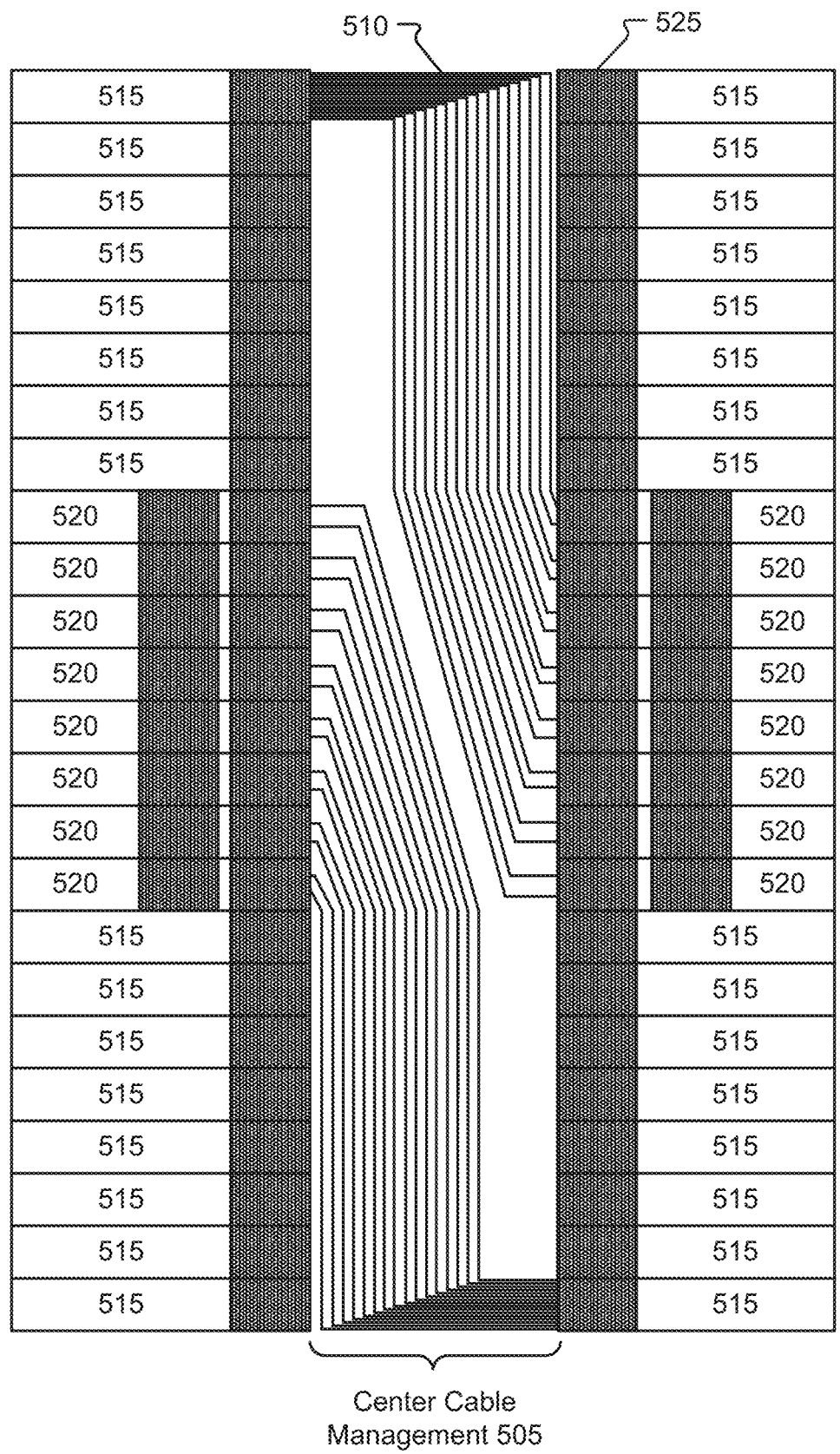
FIGS. 5A and 5B illustrate a cable routing schematic in accordance with embodiments of the present disclosure.
Figure 5B:
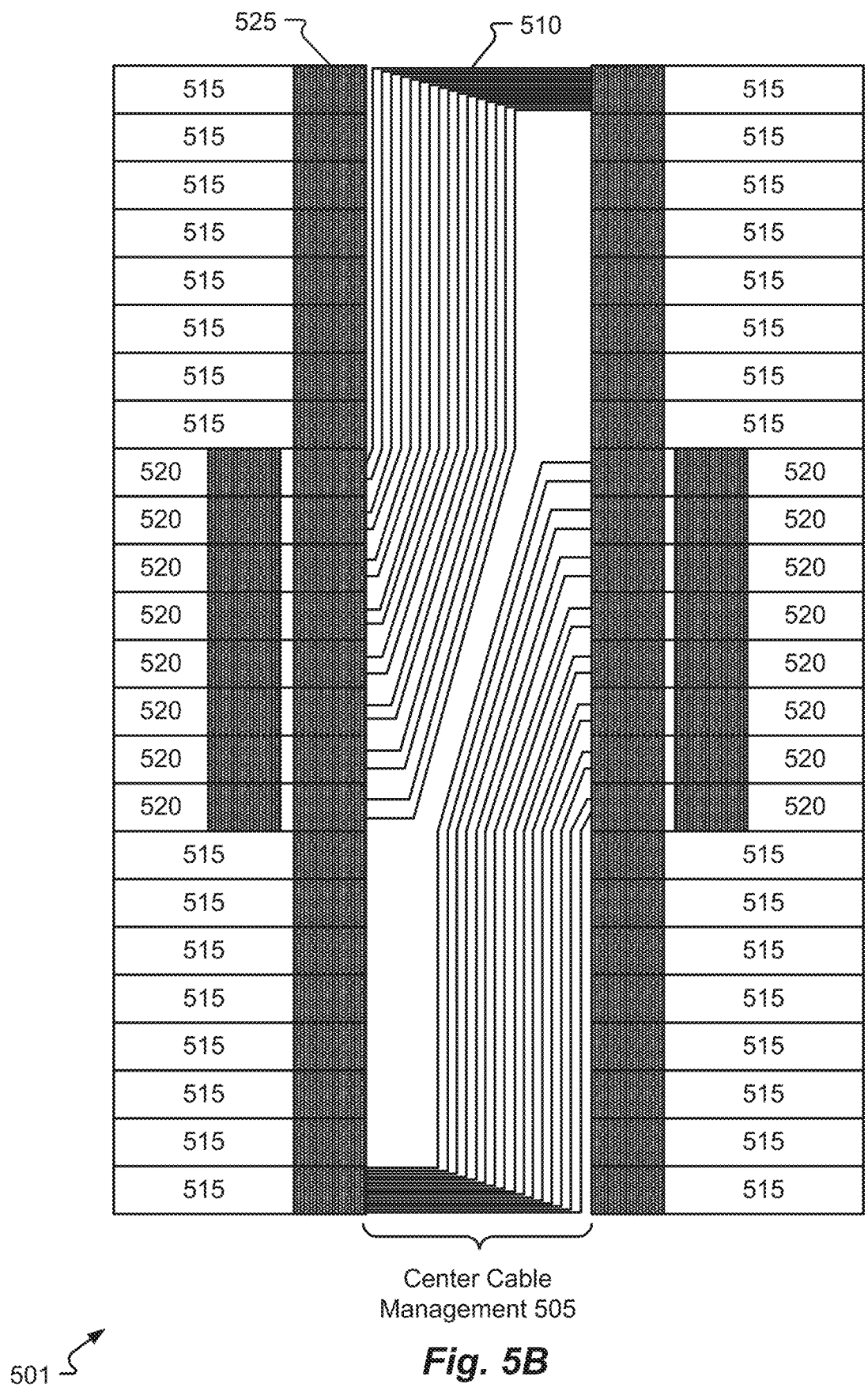

FIGS. 5A and 5B illustrate a cable routing schematic for a cable pillar layer in a switch system (e.g., director switch) in accordance with embodiments of the present disclosure. FIG. 5A illustrates a first cable routing schematic 500 for the cable pillar layer as described herein, and FIG. 5B illustrates a second cable routing schematic 501 for the cable pillar layer as described herein. Both the first cable routing schematic 500 and the second cable routing schematic 501 may include an area for center cable management 505, which is described with reference to the area for center cable management 340 in FIG. 3C. Additionally, the cable pillar layer described herein may be located in this area for center cable management 505 to provide routing of a plurality of cables 510 from one or more leaf modules 515 (e.g., the first type of network switches 315 as described with reference to FIGS. 3A to 3C) to one or more spine modules 520 (e.g., the second type of network switches 320 as described with reference to FIGS. 3A to 3C). Each of the leaf modules 515 may include a set of ports 525 for plugging in one or more cables, and each of the spine modules 520 may include multiple sets of ports 525 for plugging in one or more cables.

As described herein, the cable pillar layer may at least partially contain and support a cable backplane of a switch system, where the cable backplane includes the plurality of cables 510 for providing interconnections between a plurality of switch modules of the switch system (e.g., the leaf modules 515 and the spine modules 520). Subsequently, this cable backplane connects each of the spine modules 520 to at least one leaf module 515. In some examples, the spine modules 520 connected to the at least one leaf module 515 may be on an opposing side of the cable backplane than the at least one leaf module 515 to which the spine modules 520 are connected.

For example, as shown in the example of the first cable routing scheme 500, the top left leaf module 515 of the switch system is connected to each of the spine modules 520 on the right side of the switch system (e.g., opposite side of the switch system from the corresponding leaf module 515), and the bottom right leaf module 515 of the switch system is connected to each of the spine modules 520 on the left side of the switch system. Additionally or alternatively, as shown in the example of the second cable routing scheme 501, the top right leaf module 515 of the switch system is connected to each of the spine modules 520 on the left side of the switch system (e.g., opposite side of the switch system from the corresponding leaf module 515), and the bottom left leaf module 515 of the switch system is connected to each of the spine modules 520 on the right side of the switch system. While not shown, the leaf modules 515 may also include cable connections between each other (e.g., lower leaf modules 515 are connected to a ToR switch, upper leaf modules 515 are connected to a switch located at the bottom of the switch system, etc.).

It is understood that while 16 cables are shown being connected between a leaf module 515 and each of the spine modules 520 (e.g., with two (2) cables being connected to each spine module 520), a greater or lesser number of cables can be routed through the cable pillar layer. Additionally, a greater or lesser number of leaf modules 515 and/or spine modules 520 can be included in a switch system that includes the cable pillar layer as described herein.

Referring now to FIGS. 6A through 6F, additional details of a cable pillar 600 and the cable pillar layer(s) 604 that make up the cable pillar 600 will be described in accordance with at least some embodiments of the present disclosure. While the cable pillar 600 is shown to have a particular number of cable pillar layers 604 (e.g., cable pillar layers 604A-H), it should be appreciated that a cable pillar 600 can have a single cable pillar layer 604 or many more cable pillar layers 604 than shown. Indeed, the cable pillar 600 can have one, two, three, four, . . . , ten, or more cable pillar layers 604 without departing from the scope of the present disclosure.

The various cable pillar layers 604A-H that make up a cable pillar 600 may have similar or different configurations from one another. For instance, some cable pillar layers 604 may be configured or used to support center cable management whereas other cable pillar layers 604 may be configured or used to support side cable management. One, some, or all of the cable pillar layers 604A-H may have a cavity and a set of access paths adjacent to the cavity. The set of access paths for any given cable pillar layer 604 may facilitate a pre-routing of cables through the cavity according to a routing plan. Each cable pillar layer 604 may also be configured to physically support cables 608 passing through its cavity in an absence of the cable pillar layer 604 being interconnected to the plurality of switch modules or to the chassis. This may provide a modularity such that it becomes possible to individually add or remove cable pillar layers 604 to/from the cable pillar 600.

The cable pillar layers 604A-H may be constructed similar to the cable pillar layer depicted and described in connection with FIGS. 4A-4C. Other constructions of the cable pillar layer 604 are also possible.

FIGS. 6B through 6E illustrate the different sets of cables 608A-H that may be routed through the cable pillar 600. FIG. 6F illustrates a cable pillar 600 configuration where all sets of cables 608A-H are shown. The combination of cables 608A-H shown in FIGS. 6B through 6E can be simultaneously supported/routed through the cable pillar 600 as shown in FIG. 6F. This highlights the complexity and number of cables 608A-H that are conveniently organized by the cable layers 604A-H of the cable pillar 600. In some embodiments, a first set of cables 608A are routed through a cavity of the first cable pillar layer 604A, a second set of cables 608B are routed through a cavity of the second cable pillar layer 604B, a third set of cables 608C are routed through a cavity of the third cable pillar layer 604C, a fourth set of cables 608D are routed through a cavity of the fourth cable pillar layer 604D, a fifth set of cables 608E are routed through a cavity of the fifth cable pillar layer 604E, a sixth set of cables 608F are routed through a cavity of the sixth cable pillar layer 604F, a seventh set of cables 608G are routed through a cavity of the seventh cable pillar layer 604G, and an eighth set of cables 608H are routed through a cavity of the eighth cable pillar layer 604H. One, some, or all of the sets of cables 608A-H may be routed according to a routing plan within a respective cavity of a cable pillar layer 604A-H.

Figure 6A:
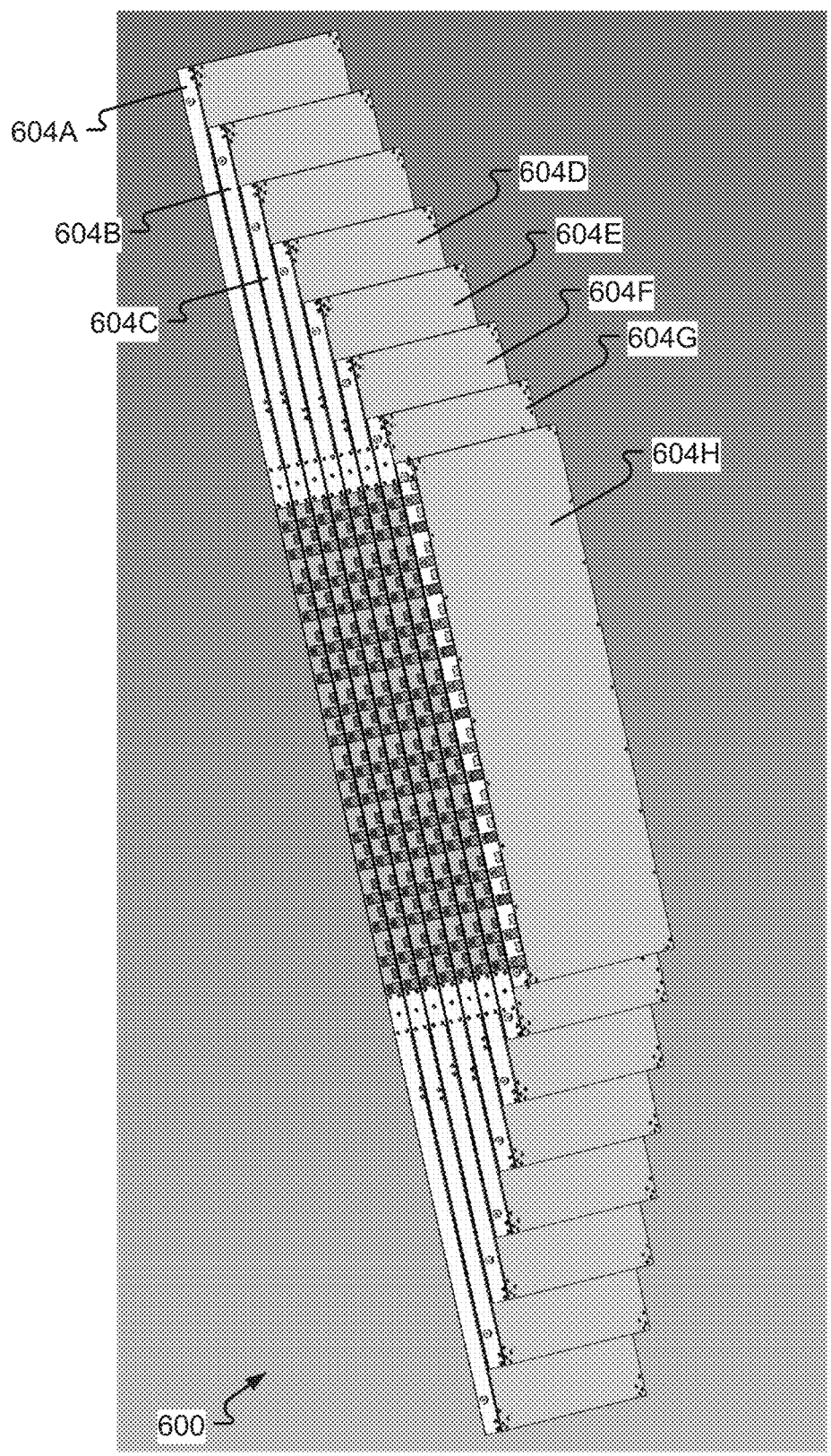
FIGS. 6A to 6F illustrate various views of a cable pillar and its cable pillar layers in accordance with embodiments of the present disclosure.
Figure 6B:
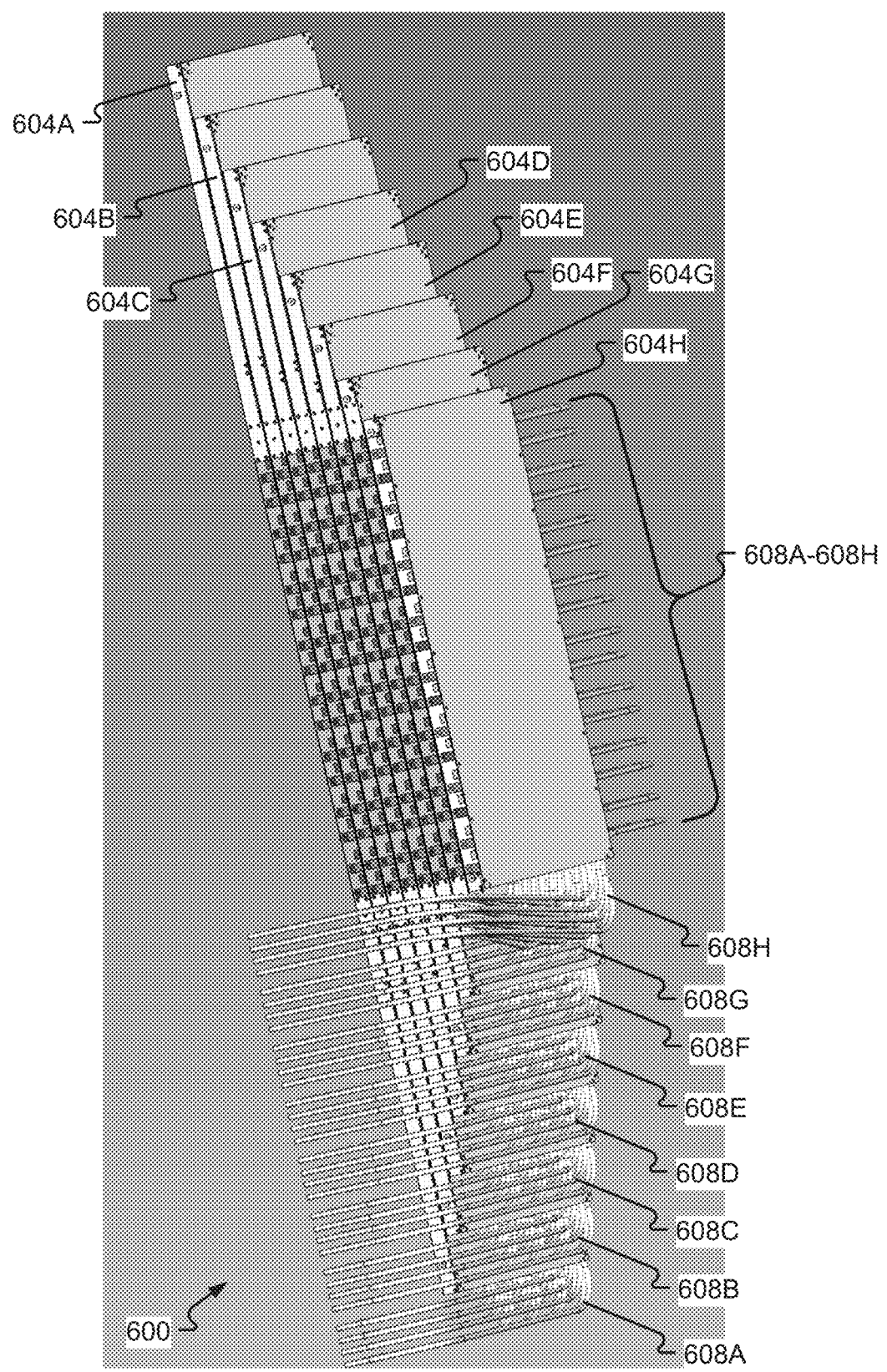

Specifically, as a non-limiting example, FIG. 6B illustrates that some of the cables 608A-H may enter a cavity of a corresponding cable pillar layer 604A-H at the right side, but exit the cavity of the corresponding cable pillar layer 604A-H out the bottom side. It may also be possible that some of the cables 608A-H enter and exit at the same side of the corresponding cable pillar layer 604A-H.

Figure 6C:
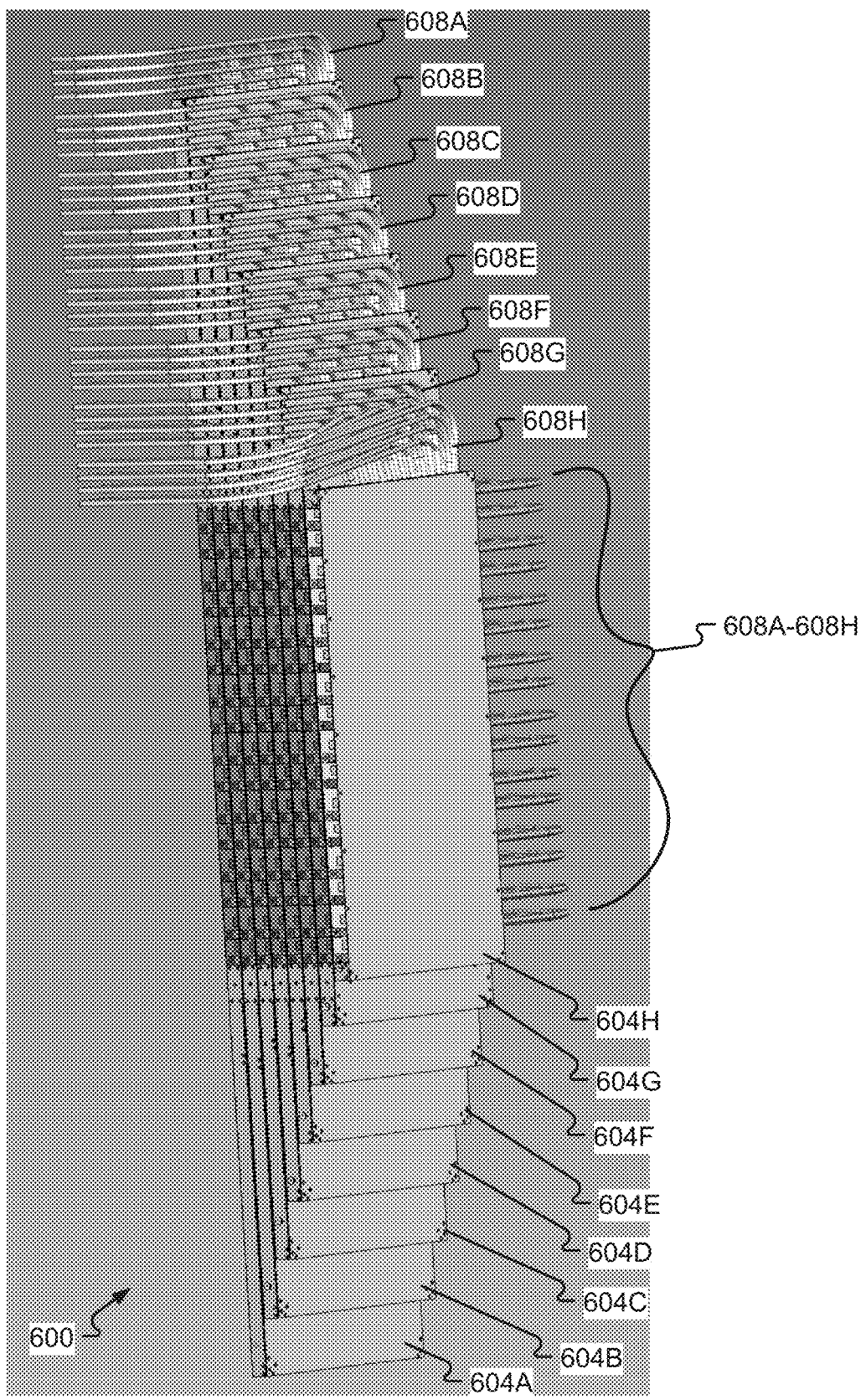

FIG. 6C illustrates that some of the cables 608A-H enter a cavity of a corresponding cable pillar layer 604A-H at the right side, but exit the cavity of the corresponding cable pillar layer 604A-H out the top side. It may also be possible that some of the cables 608A-H enter and exit the same side of the corresponding cable pillar layer 604A-H.

Figure 6D:
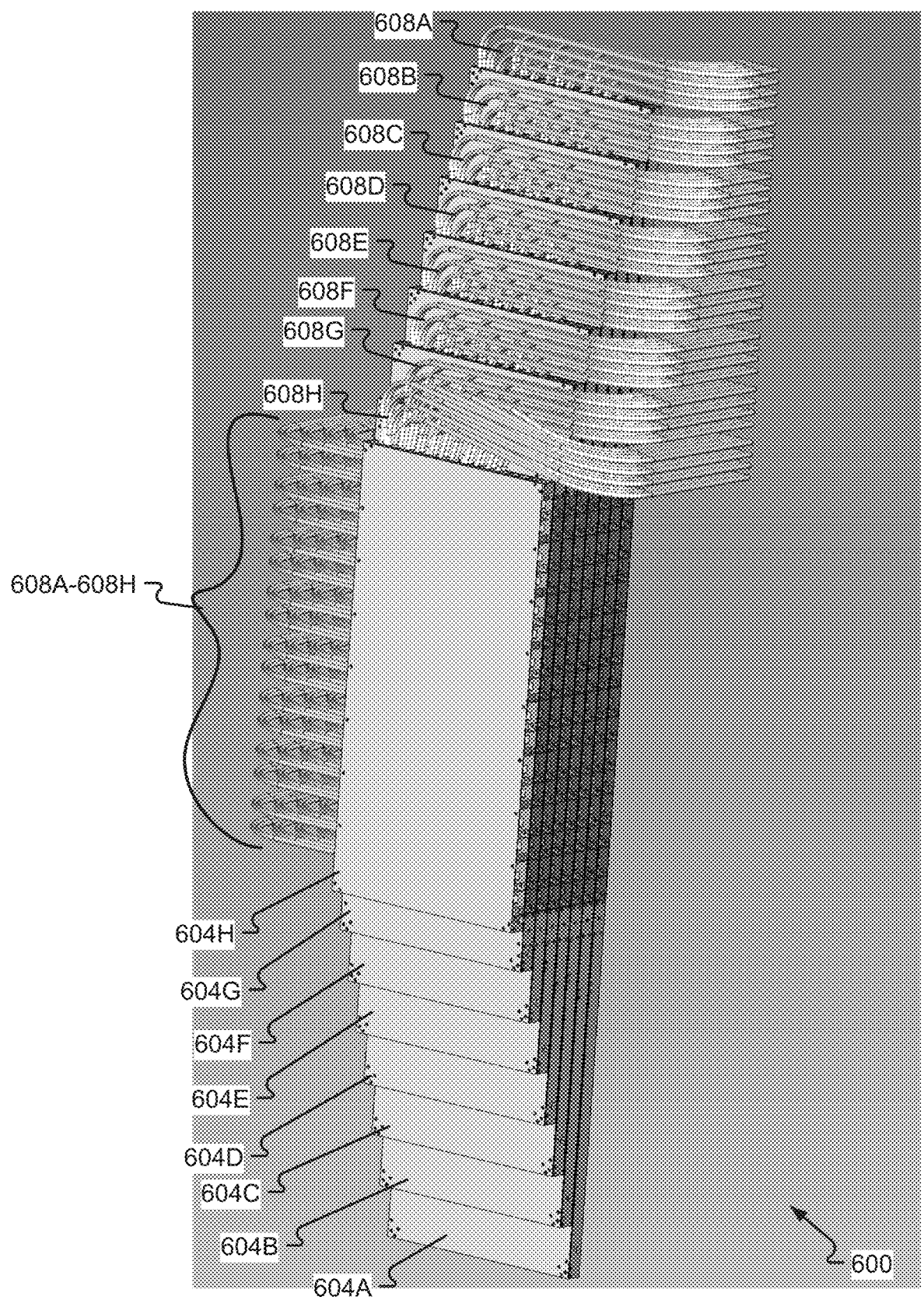

FIG. 6D illustrates that some of the cables 608A-H enter a cavity of a corresponding cable pillar layer 604A-H at the left side, but exit the cavity of the corresponding cable pillar layer 604A-H out the top side. It may also be possible that some of the cables 608A-H enter and exit the same side of the corresponding cable pillar layer 604A-H.

Figure 6E:
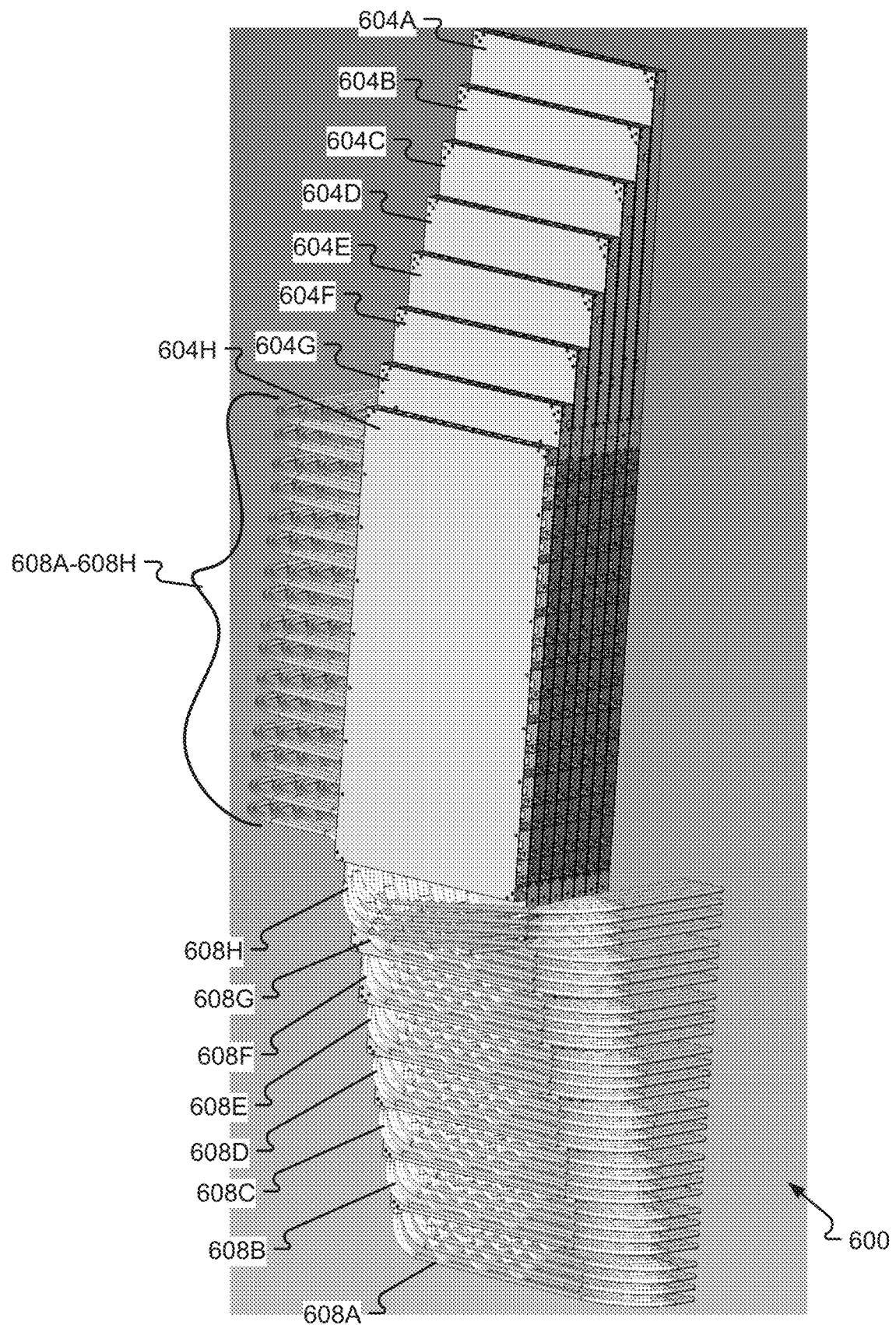
Figure 6F:
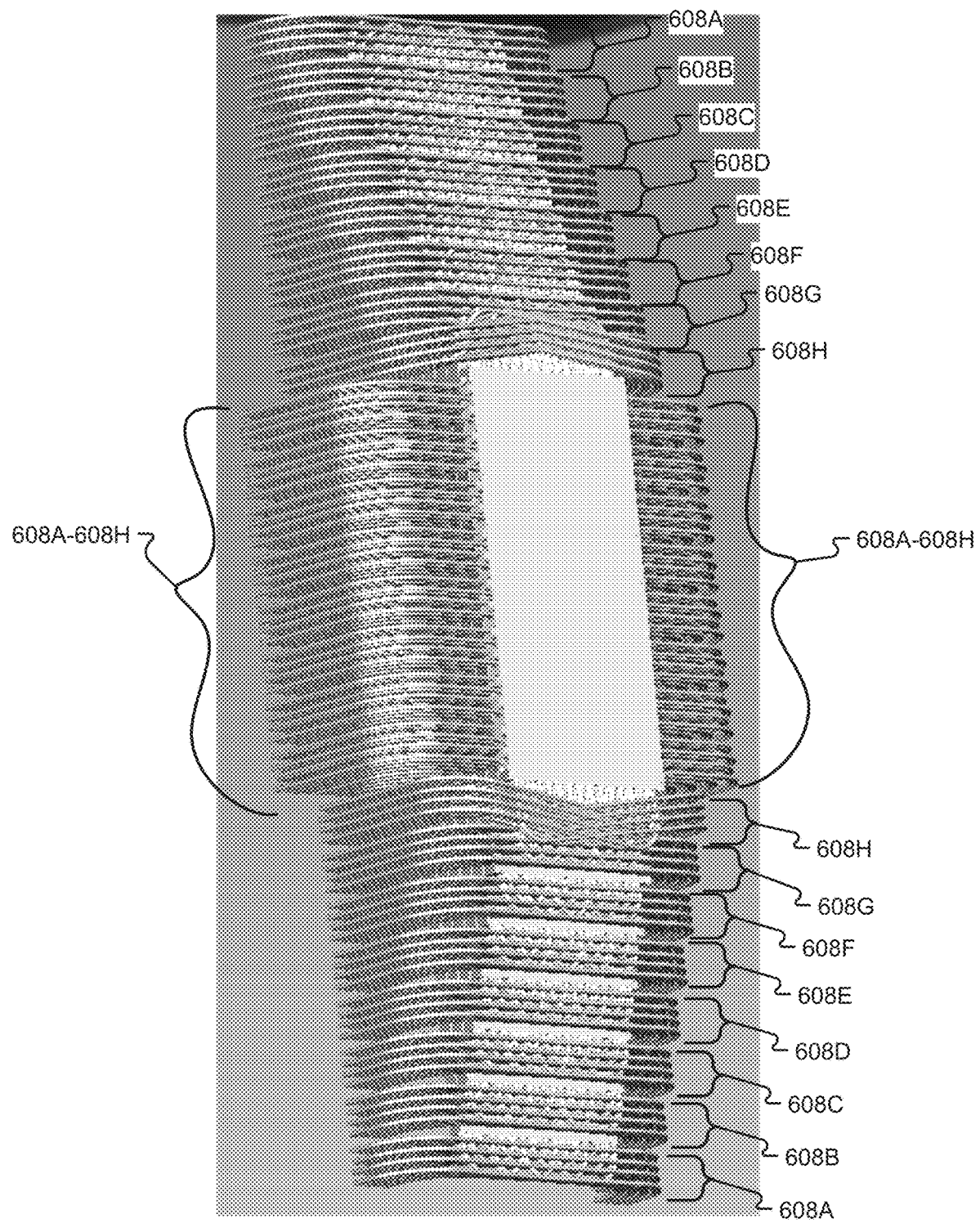

FIG. 6E illustrates that some of the cables 608A-H enter a cavity of a corresponding cable pillar layer 604A-H at the left side, but exit the cavity of the corresponding cable pillar layer 604A-H out the bottom side. It may also be possible that some of the cables 608A-H enter and exit the same side of the corresponding cable pillar layer 604A-H.

The cable pillar 600 is shown to have cable pillar layers 604A-H of different lengths, but common depths and widths. Such a configuration is convenient for use with a switch system 300 having limited space, but is not required. In the depicted embodiment, the longest cable pillar layer 604 (e.g., the first cable pillar layer 604A) may be mounted directly to a chassis of the switch system while the others shorter cable pillar layers 604B-H are mounted to another longer cable pillar layer 604A-G.

Figure 7:
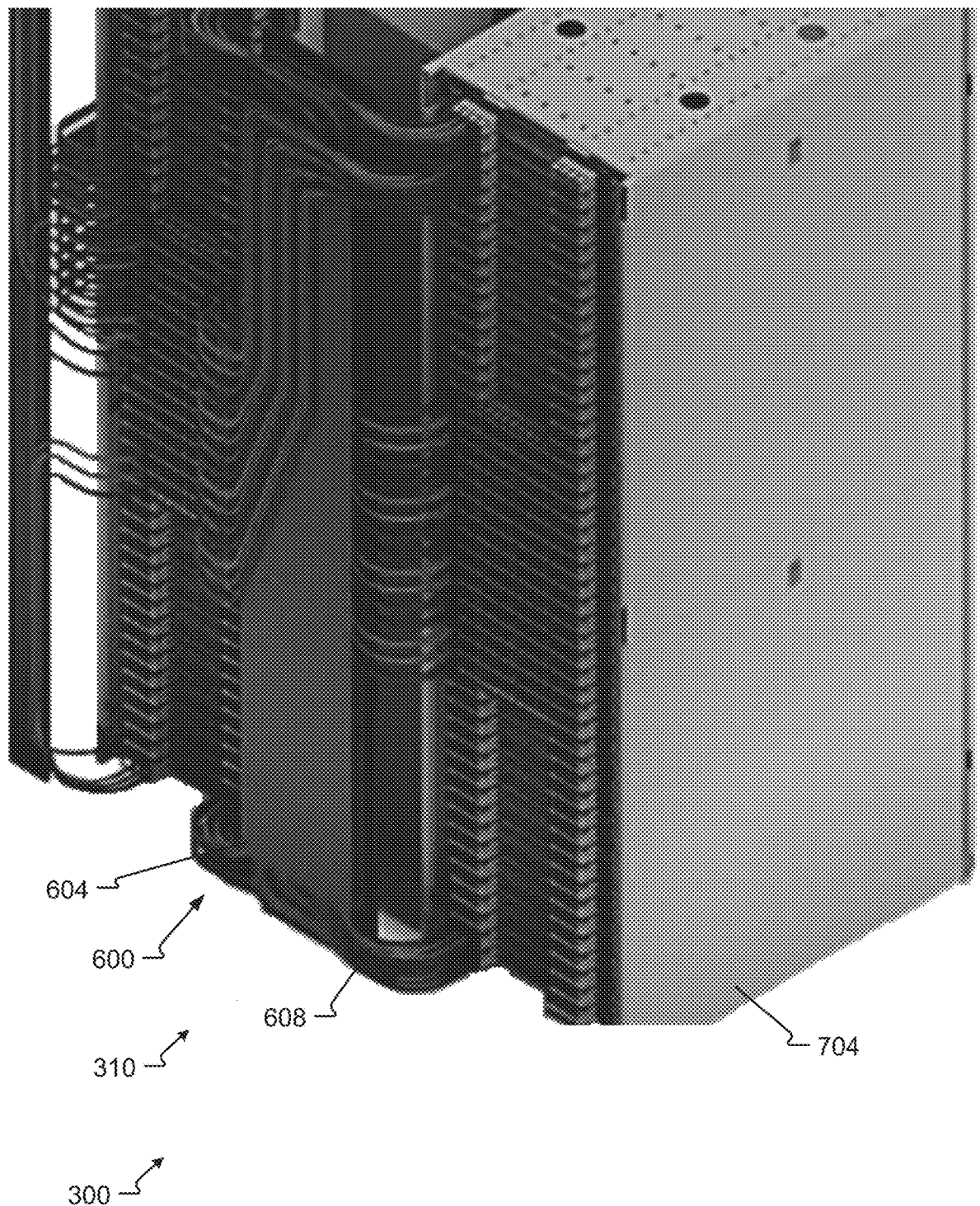
FIG. 7 provides a magnified view of the switch system of FIG. 3A and illustrates the switch system having a cable pillar mounted to a chassis in accordance with embodiments of the present disclosure.

FIG. 7 illustrates an installment of a cable pillar 600 onto a chassis 704 of a switch system 300 in accordance with at least some embodiments of the present disclosure. As shown in FIG. 7, the longest cable pillar layer (e.g., the first cable pillar layer 604A) may be mounted directly to the chassis 704 while other shorter cable pillar layers may be mounted to the longest cable pillar layer or intermediate cable pillar layers. One, some, or all of the cable pillar layers 604 in the cable pillar 600 may be used to route some of the plurality of cables 608 used to establish connectivity between computing components mounted inside the chassis 704. The cable pillar 600 may be accessible at the back side 310 of the chassis 704. Cable pillar layers 604 may be removed one-at-a-time without having to remove other cable pillar layers 604 or disconnecting the cables 608 routed through the non-removed cable pillar layers 604.

Any of the steps, functions, and operations discussed herein can be performed continuously and automatically.

The exemplary systems and methods of this disclosure have been described in relation to a dual connect switch module. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

What is claimed is:

1. A cable pillar layer configured to be included in a cable pillar for use in a director switch, the cable pillar layer comprising:

a main support structure comprising a first face, a second face, a top end, a bottom end, a first side end, and a second side end, wherein the first face opposes the second face;

a first rail mounted on the main support structure, wherein the first rail comprises a first set of access paths and wherein the first rail is configured to attach to a chassis of the director switch; and a second rail mounted on the main support structure, wherein the second rail comprises a second set of access paths, wherein the second rail is configured to attach to the chassis of the director switch, and wherein the first rail and the second rail, when mounted on the main support structure, create a cavity adjacent to the first face of the main support structure that enable a plurality of cables to pass from the first side end of the main support structure across the first face of the main support structure and to the second side end of the main support structure.

2. The cable pillar layer of claim 1, wherein a depth of the cavity is greater than a thickness of one of the cables in the plurality of cables.

3. The cable pillar layer of claim 2, further comprising:
a third rail mounted on the main support structure; and
a fourth rail mounted on the main support structure.

4. The cable pillar layer of claim 3, wherein the third rail is mounted to the top end of the main support structure, and wherein the fourth rail is mounted on the bottom end of the main support structure.

5. The cable pillar layer of claim 3, further comprising:
a first enlarged access path provided between the first rail and the third rail; and
a second enlarged access path provided between the second rail and the fourth rail.

6. The cable pillar layer of claim 5, wherein the first enlarged access path is sized to receive every cable that passes through the second set of access paths and wherein the second enlarged access path is configured to receive every cable that passes through the first set of access paths.

7. The cable pillar layer of claim 5, wherein a size of the first enlarged access path is at least four times greater than a size of an access path in the second set of access paths and wherein a size of the second enlarged access path is at least four times greater than a size of an access path in the first set of access paths.

8. The cable pillar layer of claim 5, further comprising:
a third enlarged access path provided between the second rail and the third rail; and
a fourth enlarged access path provided between the first rail and the fourth rail.

9. The cable pillar layer of claim 1, wherein the main support structure is substantially planar.

10. The cable pillar layer of claim 1, wherein a number of access paths in the first set of access paths is equal to a number of access paths in the second set of access paths.

11. The cable pillar layer of claim 1, wherein the first rail and the second rail reinforce a stiffness of the main support structure.

12. The cable pillar layer of claim 1, wherein the first rail and the second rail are both configured to releasably attach to the chassis of the director switch.

13. The cable pillar layer of claim 1, wherein each access path in the first set of access paths is sized to receive at least a CAT5 cable and wherein each access path in the second set of access paths is sized to receive at least the CAT5 cable.

14. The cable pillar layer of claim 1, wherein the plurality of cables are part of a cable backplane.

15. The cable pillar layer of claim 1, wherein the first rail is mounted on the first side end of the main support structure, and wherein the second rail is mounted on the second side end of the main support structure.

16. A switch, comprising:
a chassis;
a plurality of switch modules mounted in the chassis; and
a cable backplane comprising a plurality of cables that interconnect the plurality of switch modules, wherein the cable backplane is at least partially contained in and supported by a cable pillar, wherein the cable pillar comprises at least one cable pillar layer comprising:
a main support structure comprising a first face, a second face, a top end, a bottom end, a first side end, and a second side end, wherein the first face opposes the second face;
a first rail mounted on the main support structure, wherein the first rail comprises a first set of access paths and wherein the first rail attaches to the chassis; and
a second rail mounted on the main support structure, wherein the second rail comprises a second set of access paths, wherein the second rail attaches to the chassis, and wherein the first rail and the second rail create a cavity adjacent to the first face of the main support structure that enable the plurality of cables to pass from the first side end of the main support structure across the first face of the main support structure and to the second side end of the main support structure.

17. The switch of claim 16, wherein the at least one cable pillar layer further comprises:
a third rail mounted on the main support structure; and
a fourth rail mounted on the main support structure.

18. The switch of claim 17, wherein the at least one cable pillar layer further comprises:
a first enlarged access path provided between the first rail and the third rail, wherein the first enlarged access path is sized to receive every cable that passes through the second set of access paths; and
a second enlarged access path provided between the second rail and the fourth rail, wherein the second enlarged access path is configured to receive every cable that passes through the first set of access paths.

19. The switch of claim 16, wherein the cable pillar further comprises at least a second cable pillar layer mounted to the chassis adjacent to the at least one cable pillar layer, wherein a first set of cables in the plurality of cables are retained in the cavity of the at least one cable pillar layer, and wherein a second set of cables in the plurality of cables are retained in a cavity of the second cable pillar layer.

20. The switch of claim 16, wherein the plurality of switch modules comprise spine modules and leaf modules and wherein the cable backplane connects each of the spine modules with at least one leaf module.

* * * * *